M. MARKS.

CAP.

No. 7,807. Reissued July 24. 1877.

Witnesses:

Edward Marks

Edward Goodwin

Inventor:

Marcus Marks

UNITED STATES PATENT OFFICE.

MARCUS MARKS, OF NEW YORK, N. Y.

IMPROVEMENT IN CAPS.

Specification forming part of Letters Patent No. 166,395, dated August 3, 1875; Reissue No. 7,807, dated July 24, 1877; application filed May 14, 1877.

DIVISION A.

*To all whom it may concern:*

Be it known that I, MARCUS MARKS, of the city, county, and State of New York, have invented a new and useful Improvement in Caps, which improvement is fully set forth in the following specification, reference being had to the accompanying drawing, in which—

Figure 1:
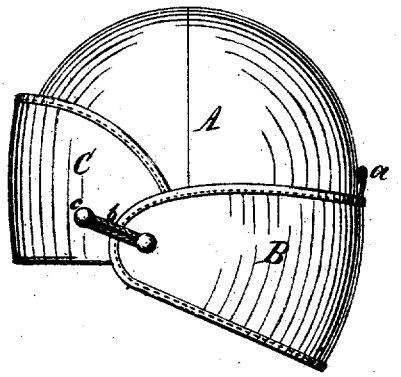
Figure 2:
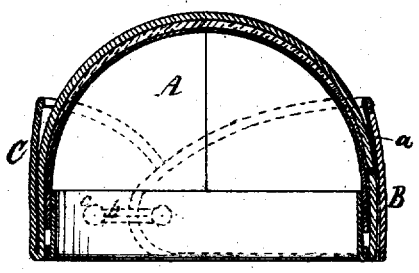

Figure 1 represents a side view when the swinging ear and neck protector is pulled down. Fig. 2 is a vertical central section when the ear and neck protector is up.

Similar letters indicate corresponding parts.

This invention consists in an ear and neck protector connected to the back part of the crown of a hat or cap by a tape or cloth, and to the sides or near the front of the hat or cap by loops and buttons, or other equivalent fastenings, in such a manner that, whenever it may be desirable, said protector can be drawn down to cover the ears and the neck of the person wearing the cap, and when no such protection is needed, said protector can be raised, when it serves to impart to a cap a finished appearance.

In the drawing, the letter A designates a cap, to the rear part of which is attached my ear and neck protector B. The protector is held in place by a tape or cloth, *a*, at the back, and by loops *b*, which are fastened to its ends, and catch over buttons *c*, secured to the band C of the cap, at the sides or near the front, said fastenings being so constructed that the protector swings up and down as far as the tape or cloth *a* will allow, the buttons *c* forming the centers on which the swinging motion takes place. It is obvious that, for loops and buttons, other devices may be substituted without deviating from my invention.

My cap is ornamented in front by a band, C, and if the protector B is raised it forms a similar band on the back part of the cap, and thereby a finished appearance is imparted to the article.

In cold or inclement weather the person wearing my cap can draw down the protector B to the position shown in Fig. 1. In this position the lower edge of said protector hugs the neck of the person wearing my cap with a close fit, and at the same time the ears of said person are covered, so that those parts are fully protected against cold air wind, rain, or snow.

My cap is exceedingly simple in its construction, it can be made and sold at a low cost, and it is of great convenience, particularly for persons compelled to spend much of their time in the open air.

What I claim as new, and desire to secure by Letters Patent, is—

As a new article of manufacture, the head-covering consisting of the crown or body A, band C, swinging ear and neck protector B, tape or cloth *a*, and fastenings *b c*, said protector being arranged upon the exterior of the article, substantially as described, and adapted to move up and down thereon.

In testimony that I claim the foregoing I have hereunto set my hand and seal this 4th day of May, 1877

MARCUS MARKS. [L. S.]

Witnesses:

C. WYLLYS BETTS,

J. E. H. HYDE.